(12) United States Patent
Karlsen et al.

(10) Patent No.: US 10,433,080 B2
(45) Date of Patent: Oct. 1, 2019

(54) HEARING AID COMPRISING AN INDICATOR UNIT

(71) Applicant: Oticon Medical A/S, Smørum (DK)

(72) Inventors: Morten Friis Karlsen, Smørum (DK); Claus Tipsmark, Smørum (DK); Per Petersen, Smørum (DK)

(73) Assignee: OTICON MEDICAL A/S, Smørum (DK)

( * ) Notice: Subject to any disclaimer, the term of this patent is extended or adjusted under 35 U.S.C. 154(b) by 0 days.

(21) Appl. No.: 15/986,994

(22) Filed: May 23, 2018

(65) Prior Publication Data

US 2018/0343528 A1    Nov. 29, 2018

(30) Foreign Application Priority Data

May 24, 2017    (EP) .................................... 17172718

(51) Int. Cl.
*H04R 25/00*    (2006.01)
*F21V 8/00*    (2006.01)

(52) U.S. Cl.
CPC ........... *H04R 25/65* (2013.01); *G02B 6/0006* (2013.01); *G02B 6/0068* (2013.01);
(Continued)

(58) Field of Classification Search
CPC ...... H04R 25/305; H04R 25/65; H04R 25/60; H04R 2225/0213; H04R 25/606; G02B 6/0006; G02B 6/0068; A61N 1/36036
(Continued)

(56) References Cited

U.S. PATENT DOCUMENTS

2008/0005944 A1* 1/2008 Rains, Jr. ................. G09F 9/33
40/563
2008/0205680 A1 8/2008 Ho et al.
(Continued)

FOREIGN PATENT DOCUMENTS

DE    10 2007 008 737 B3    7/2008
EP    3 136 752 A1    3/2017
(Continued)

*Primary Examiner* — Binh Kien Tieu
(74) *Attorney, Agent, or Firm* — Birch, Stewart, Kolasch & Birch, LLP

(57) ABSTRACT

According to an embodiment, a hearing aid is disclosed. The hearing aid includes a housing, a light guide member, a first light source, and a second light source. The housing includes electronic components configured to generate a perceivable modulated signal in response to a received sound. The perceivable modulated signal is configured to produce a hearing sensation to a user of the hearing aid. The light guide member is arranged proximal to and/or within the housing. The first light source configured to emit a first colored light and a second light source configured to emit a second colored light. The first light source and the second light source are positioned within the housing and arranged in relation to the light guide member such that a substantial amount of the first colored light and a substantial amount of the second colored light are adapted to travel through the light guide member. The light guide member includes dimensions such that the substantial amount of the first colored light and the substantial amount of second colored light are mixed within the light guide member to generate a light of a third color.

20 Claims, 4 Drawing Sheets

(52) U.S. Cl.
CPC ........... *H04R 25/305* (2013.01); *H04R 25/60* (2013.01); *H04R 2225/0213* (2019.05)

(58) Field of Classification Search
USPC ................ 381/312, 320, 322, 324, 328, 330
See application file for complete search history.

(56) References Cited

U.S. PATENT DOCUMENTS

| | | | |
|---|---|---|---|
| 2011/0029041 A1* | 2/2011 | Wiskerke | H04R 25/606 |
| | | | 607/57 |
| 2013/0258700 A1 | 10/2013 | Schuch et al. | |
| 2017/0064463 A1 | 3/2017 | Greenberger | |
| 2018/0302709 A1* | 10/2018 | Wagner | A61B 5/6898 |
| 2019/0053764 A1* | 2/2019 | LeBoeuf | G06F 19/00 |
| 2019/0056088 A1* | 2/2019 | York | F21V 7/0033 |
| 2019/0099130 A1* | 4/2019 | LeBoeuf | A61B 5/0077 |

FOREIGN PATENT DOCUMENTS

| | | | | |
|---|---|---|---|---|
| WO | WO 2010/092193 A2 | 8/2010 | | |
| WO | WO 2010/092193 A3 | 8/2010 | | |
| WO | WO-2010092193 A3 * | 3/2011 | ............ | H04R 25/30 |
| WO | WO 2016/141062 A2 | 9/2016 | | |
| WO | WO 2016/141062 A3 | 9/2016 | | |

\* cited by examiner

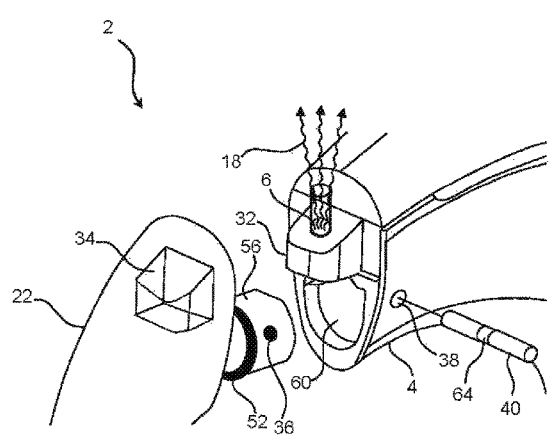
Fig. 3A
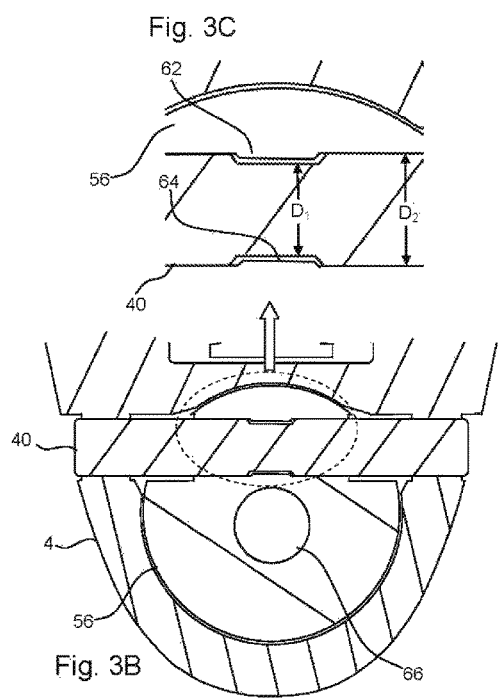
Fig. 3B
Fig. 3C

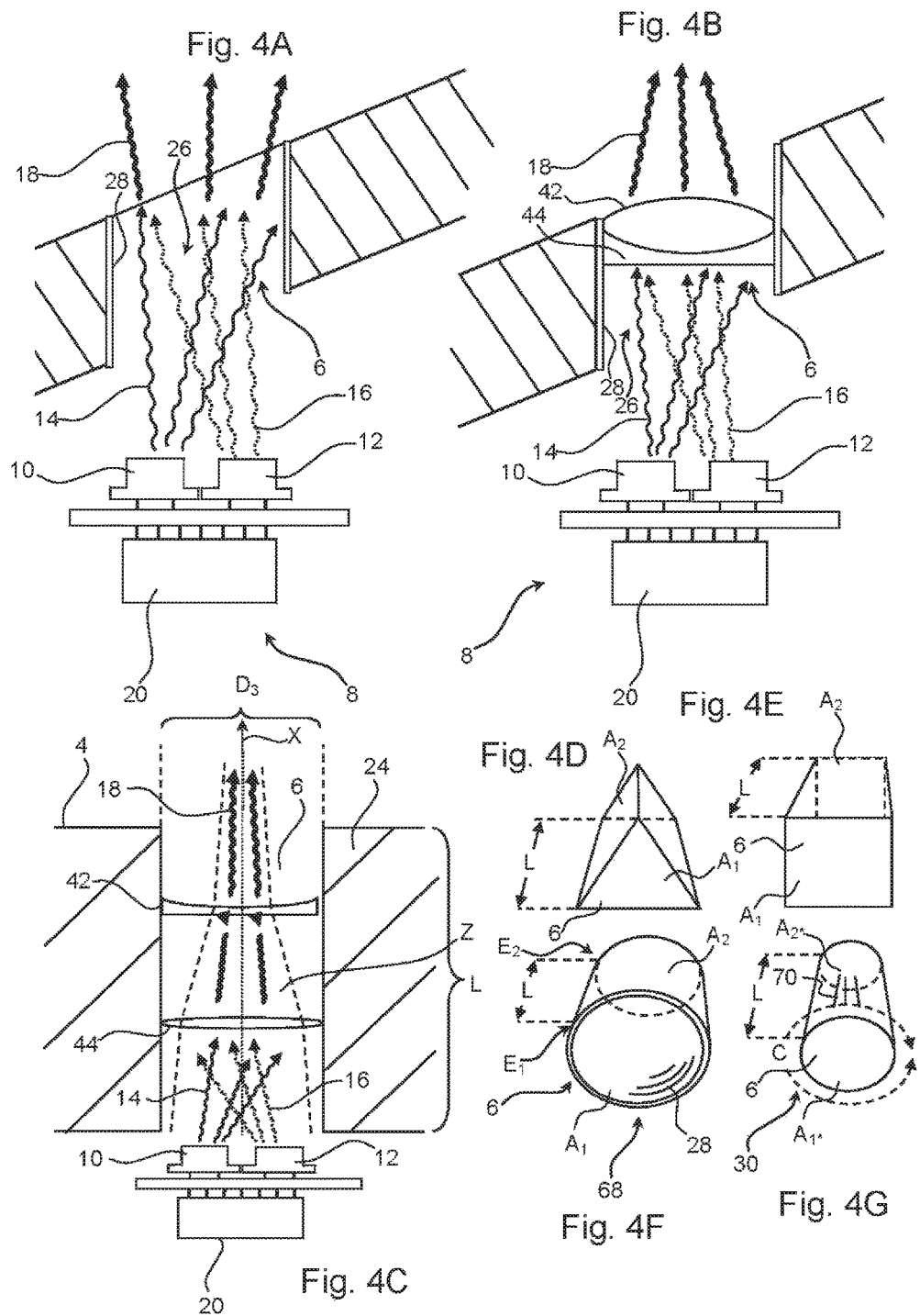

HEARING AID COMPRISING AN INDICATOR UNIT

FIELD

The disclosure relates to an indicator unit configured to provide notification or alert indication. In particular, the disclosure relates to a hearing aid comprising the indicator unit that is arranged such that light emitted from the indicator unit passes through a light guiding member.

BACKGROUND

Medical electronic devices have become indispensable. Such devices may include a hearing aid as well. A hearing aid is a device for aiding an individual in regard to his or her hearing. It may be used to compensate a hearing loss, namely a conventional acoustic hearing aid amplifying sound, or a cochlear implant that electrically stimulates nerve cells or a bone conduction hearing aid. It may also be a hearing protection device which helps individuals to hear without damage in noisy environments. It may also be a tinnitus treatment device.

These devices may routinely be required to provide a notification or alert function in response to different operating conditions of these devices. For example, it is desirable for a hearing aid to provide notification for scenarios such as energy level of battery providing operating power to the hearing aid falling below a threshold, one of the components of the hearing aid performing sub-optimally, hearing aids in a binaural hearing aid system establishing a communicative coupling/decoupling, hearing aid transmitter unit or receiver unit failing to transmit or receive signals, feedback leakage exceeding beyond the permissible limit, etc. Similarly, other scenarios requiring notification may also be contemplated.

Such notifications are particularly useful when the hearing aid user includes children. One exemplary scenario includes hearing impaired children using wireless system for education, it may be very difficult for the caretaker to know whether the wireless system is actually working properly. Especially small children cannot report whether their receiver system is functional, thus a visual notification that the individual receiver unit is functional and is receiving properly may greatly improve ease of use for the caretaker.

For providing visual notification, the hearing aids are typically fitted with a light source such as a light emitting diode (LED). However, such LED is typically adapted to provide illumination of a specific color. Therefore, in order to increase type of visual notification signals using LEDs, the general approach may include to provide more number of LEDs wherein each LED typically provides illumination of a specific color. With such approach, the number of notifications is typically equal to number of LEDs emitting different colored light. Unfortunately, in order to produce a good number of notifications, this solution requires incorporating a large number of LEDs within a rather small sized hearing aid. This makes manufacturing of the hearing aid cumbersome and inclusion of a large number of LEDs also restricts design choice because space availability for other components is compromised. Thus, the goal of designing a smaller sized discreet hearing aid becomes challenging.

The disclosure proposes a solution that overcomes the aforementioned drawbacks.

SUMMARY OF THE INVENTION

According to an embodiment, a hearing aid is disclosed. The hearing aid includes a housing, a light guide member, a first light source, and a second light source. The housing includes electronic components configured to generate a perceivable modulated signal in response to a received sound. The perceivable modulated signal is configured to produce a hearing sensation to a user of the hearing aid. The light guide member is arranged proximal to and/or within the housing. The first light source configured to emit a first colored light and a second light source configured to emit a second colored light. The first light source and the second light source are positioned within the housing and arranged in relation to the light guide member such that a substantial amount of the first colored light and a substantial amount of the second colored light are adapted to travel through the light guide member. The light guide member includes dimensions such that the substantial amount of the first colored light and the substantial amount of second colored light are mixed within the light guide member to generate a light of a third color.

The light guide member within the housing may refer to the light guide member being an integral part of the housing.

Thus, the guide member is adapted to include dimensions to allow mixing of substantial amount of the first colored light and the substantial amount of second colored light within the light guide member to generate a light of a third color.

In one embodiment, the light guide member is hollow such as a hollow tunnel or hollow tube and the light from the light sources passes through the hollow section. In another embodiment, the light guide member is a solid and the light from the light sources passes through the solid material that forms the solid light guide member. The solid light guide member may be made up of a transparent material or translucent plastic material. The translucent plastic material may further include glass fibers, which may be up to 65% by mass of the composition of the translucent plastic material.

The light source typically includes a Light Emitting Diode (LED). The LED emits light in a narrow band of wavelength. Two or more LEDs emitting in different wavelength bands may be used together to generate a mixed light in a desired color. When light from multiple LEDs are used together, the light from the LEDs are preferably mixed so that the mixed light appears uniform.

It may be useful that the light sources are arranged in close proximity to the end portion of the light guide member. Hereby, a major portion of the light emitted by the light sources will travel through the light guide member, "in close proximity" may be within a distance less than 0.1-3 times the length of the light guide member, preferably a distance less than 0.2-2 times the length of the light guide member, such as a distance less than 0.3-1 times the length of the light guide member.

The geometric shape of the light guide member and its position relative to the light sources determines its ability to receive and guide light emitted by the light sources. Accordingly, the light guide member is shaped and arranged in a manner that allows a substantial amount of the first colored light emitted by the first light source and a substantial amount of the second colored light emitted by the second light source. Hereby, the light guide member is capable of receiving and mixing the first light and the second light into a mixed light having a color that differs from the color of the first light and the second light. A substantial amount may be a percentage that allows for providing a mixed light having an intensity above a predefined lower limit. Thus, a "substantial amount" may depend on the intensity of the light sources. In a preferred embodiment according to the disclosure, the light guide member is capable of receiving 25-substantially close to 100%, preferably 50-substantially close to 100%, such as 75-substantially close to 100% of the light emitted by the light sources.

In one embodiment according to the disclosure the dimensions are defined by a ratio between circumference and length of the light guide member, the ratio being below a threshold ratio. Hereby, it possible to ensure that the light guide member is capable of allowing a substantial amount of the first colored light emitted by the first light source and a substantial amount of the second colored light emitted by the second light source to be received and guided by the light guide member.

It should be noted that ability of the light guide member to receive and guide light relate to the length and circumference of the light guide member. However, since the ratio between circumference and length of the light guide member determines its ability to guide the received light, this ratio (defined below) is crucial in allowing substantial mixing of the first colored light and second colored light:

$$\text{Ratio} = \text{circumference of the light guide member} / \text{length of the light guide member} \quad \text{Equation (1)}$$

It may be an advantage that the ratio is below a predefined threshold ratio in order to provide a light guide member having a suitable geometry. The predefined threshold ratio may be less than such as less than 9, preferably between 4.5 and 9. For example, for a uniform circular section guide member, if the diameter is 1.7 mm, then the length of the guide member is 0.7 mm.

Additionally or alternatively, in an embodiment according to the disclosure, the light guide member comprises dimensions such that a ratio between cross-sectional surface area of the light guide member at the light source end and length of the light guide member along the longitudinal axis is within a cross-sectional threshold ratio.

$$\text{Ratio} = \text{cross-sectional surface area of the light guide member at the light source end} / \text{length of the light guide member along the longitudinal axis} \quad \text{Equation (2)}$$

The light source end may be defined as an end of the light guide member closer to the light source.

In one embodiment according to the disclosure the cross-sectional threshold ratio is less than 4.5.

It may be advantageous that the ratio is below a predefined threshold ratio in order to provide a light guide member suitable to allow substantial amount of first colored light and/or second colored light to travel through the light guide member.

In an even further embodiment according to the disclosure the electronic component comprises a processing unit configured to operate the first light source and the second light source in a singular mode where only one of the first light source and the second light source is activated to emit the first colored light for providing a first notification and to emit the second colored light for providing a second notification respectively; and a mixed mode where both the first light source and the second light source are activated for producing a mixed light of the third color comprising the first colored light and the second colored light for providing a third notification. The processing unit is configured to operate the first light source and the second light source in the singular mode or mixed mode in response to operating status of the hearing aid.

Hereby, it is possible to apply the first and second light sources to provide both the first notification, the second notification and the third notification. The different notifications are preferably assigned to different operating status of the hearing aid.

The notification are useful in providing visual alarm/information to the user or to a caregiver. Typically such notifications provide operating status of the hearing aid such as battery level, Bluetooth connection established, etc.

In yet another embodiment according to the disclosure the electronic component comprises a processing unit configured to control relative intensities of the first colored light and the second colored light such that different shades of the third color are produced in the mixed mode, the different shades being assignable to different operating status notifications.

Hereby, it is possible to generate a large number (types) of notifications with a few number of light sources. It may be useful that the processing unit is configured to control the light sources to emit light of five or more, preferably eight or more such as ten or more different intensities.

In a further embodiment according to the disclosure, the light guide member is at least partly contained in a permanently attached or detachably attached ear hook such that the light guide member is
  i) completely contained in the ear hook defining proximity to the housing, or
  ii) partly contained in the ear hook defining proximity to the housing and partly contained in the housing.

Hereby, it is possible to provide two different possibilities. Option i) makes manufacturing easier as the entire guide member is contained only in one unit, i.e. in the ear hook and consideration of aligning of two part guide member as in option iii can be avoided. Option ii) makes the mixing more effective because part of the guide member is contained in the housing and thus in close proximity to the light sources that are contained in the housing.

In yet another embodiment, the light guide member is completely contained within the housing as an integrated protrusion of the housing or a guide section running along thickness of the wall of the housing. In other words, the light guide member is an inseparable one-piece assembly with the housing. This option provides the most preferred solution because it not only demonstrates the advantages that are presented by individual options i) and ii) as recited above in the earlier embodiment, but also allows for a superior sealing of the housing against liquid or dust because the light guide member is integrated protrusion from the housing or a guide section running along thickness of the wall of the housing. In other words, the light guide member is part of the housing. In one embodiment, the light guide member is a solid light guide member, whereas in the other embodiment, the light guide member is a hollow light guide member with proximal end of the hollow light guide member being covered with an integral surface cover. In these embodiments, the ear hook is substantially transparent and the light emitted out of the light guide member contained completely in the housing enters the substantially transparent ear hook and is emitted out from the entire ear hook.

In the disclosure, the term proximal end is defined by end of the light guide member comprised within the housing opposite to the light source end, the proximal end is adapted to interface with surface of the ear hook.

In another embodiment according to the disclosure, the housing comprises a substantially transparent housing wall at least within a proximal cross sectional area at a proximal end of the light guide member, the substantially transparent housing wall being configured to allow at least one of the first colored light, and second colored light to emit out of the housing towards the ear hook: and the ear hook comprises substantially transparent ear hook walls at least within a first cross sectional area and at least within a second cross sectional area at a first end and a second end of the light guide member respectively, the substantially transparent ear hook wall at the first end is configured to receive at least one of the first colored light and second colored light from the proximal area and substantially transparent hook wall at the second end allows at least one of the first colored light, second colored light and third colored light to emit out of the hearing aid. The term at least in the at least within a first cross sectional area and at least within a second cross sectional area may include an ear hook that is substantially transparent. Hereby, the substantially transparent housing wall and the substantially transparent ear hook wall can receive and transmit the light emitted towards it.

Unless the tunnel is specifically recited as hollow in a particular embodiment; in various embodiments throughout the disclosure, the term tunnel includes both solid light guide member and a hollow light guide member.

In a further embodiment according to the disclosure, the light guide member comprises a tunnel, which may be hollow or solid, comprises a cross section selected from a group consisting of a circular cross section, elliptical cross section, rectangular cross section and square cross section, wherein the cross section of the light guide member is dimensioned such that the light guide member is uniform along length of the light guide member or the cross section of the light guide member varies along length of the light guide member, the variation comprising gradual or stepwise reduction in dimension from the end of the light source end to end of the ear hook end.

It may be advantageous to apply a tunnel, hollow or solid, in which the circumference decreases, in order to provide an increasing mixing of the first light and the second along the length of the tunnel from light source end to the hook end.

In one embodiment, all circumferences with respect to length should satisfy at least one of the equation (1) and equation (2).

In another embodiment according to the disclosure, the ratio condition may be considered to be satisfied when the mid-section (along the length) circumference satisfies the condition of equation (1).

In yet another embodiment according to the disclosure, ratio condition may be considered to be satisfied when 50% of different circumferences defining the guide member satisfies the condition of equation (1).

In a further embodiment according to the disclosure, the light guide member is a hollow light guide tube comprising an inner surface having a reflective lining. The reflective lining is configured to reflect the light impinging of the inner surface towards center of the light guide tube. The inner surface of the light guide tube is preferably smooth comprising a profile roughness parameter $R_a$ of less than 2 μm.

Hereby, it is possible to provide a total internal reflection that makes it possible to mix the light of first color and second color around center of the longitudinal axis of the guide member. The reflective lining thus avoids that the inner surface to transmit the first colored light and second colored light from the inner surface extending along the length of the hollow tunnel.

In a further embodiment according to the disclosure, the light guide member is a solid light guide tube comprising an outer surface that is adapted to prevent light escaping from the solid light guide member. This may be implemented by the outer surface comprising a painted surface adapted to restrict transmission of the first colored light and/or second colored light out of the outer wall surface that extends along the length of the solid light guide member. This allows for the light within the solid light guide member to travel along the light guide member while within the light guide member, resulting in more effective mixing. The outer surface of the light guide tube is preferably smooth comprising a profile roughness parameter $R_a$ of less than 2 μm.

In a further embodiment according to the disclosure, the first light source and the second light source are arranged symmetrically with respect to cross section of the light guide member at the light source end. Hereby, it is possible to build a symmetric system.

In another embodiment according to the disclosure, the first light source and the second light source are arranged asymmetrically with respect to the cross section of the light guide member at the light source end. Hereby, it is possible to arrange the light sources in an asymmetric configuration e.g. based on the frequency of the first colored light and the frequency of the second colored light.

In a further embodiment according to the disclosure, the first light source and the second light source are arranged asymmetrically with respect to the cross section of the light guide member at the light source end. The asymmetric arrangement is a function of scattering of the first light from the first light source and scattering of the second light from the second light source along the length of the light guide member.

As scattering depends upon frequency of the light. Therefore, the first light source and the second light source are arranged with respect to the cross section of the light guide member at the light source end as a function of a first frequency of the first colored light and a second frequency of the second colored light such that scattering of the first light from the first light source and scattering of the second light from the second light source along the length of the light guide member is within a threshold angle.

In an even further embodiment according to the disclosure, the housing or the ear hook comprises a protruded part and another of the housing or ear hook comprises a receiving section. The protruded part and the receiving section may be configured to couple such that i) the light guide member is contained completely in the ear hook and aligns with the first light source and the second light source; or ii) the light guide member is contained completely in the housing as an integrated protrusion at the protruded part of the housing or a guide section running along thickness of the wall of the housing, the light guide member being adapted to be received within the receiving section of a substantially transparent ear hook; or iii) the light guide member is contained partly in the ear hook and aligns with the light guide member that is partly contained in the housing.

In an embodiment, the tunnel-shaped light guide member is provided in the protruding part of the housing.

In the embodiment where the light guide member is contained completely in the housing, the alignment of the first light source and the second light source with the light guide member is extremely precise as both the light guide member and the light source(s) are part of/contained in the same housing.

In an embodiment, where the light guide member is contained partly in the ear hook and aligns with the light guide member that is partly contained in the housing, the light guide member partly contained in the housing is already in alignment with the light sources. Accordingly, guidance and mixing of the first light and the second light is eased.

In another embodiment according to the disclosure, the coupling of the protruded part and the receiving section is configured to align a through-going hole of the ear hook and a through-going hole of the housing in such a manner that the aligned through-going holes are configured to receive an attachment unit to immovably attach the detachably attached ear hook to the housing.

The attachment unit may be configured to go through either the partial or complete length of the combined width of the protruded part and the receiving section.

Hereby, it is possible to provide a reliable and simple mechanical way of fixing the ear hook to the housing.

In an even further embodiment according to the disclosure, the light guide member comprises dimensions such that a ratio between cross sectional surface area of the light guide member at the light source end and length of the light guide member along the longitudinal axis is within a cross-sectional threshold ratio. Hereby, it is possible to provide a light guide member having a beneficial geometry with respect to the ability of receiving and guiding light.

In another embodiment according to the disclosure, the light guide member comprises dimensions such that a ratio between cross sectional area of the light guide member at the light source end and cross sectional area of the light guide member at the proximal end is within a permissible ratio. The permissible ratio is equal to or more than 1. Hereby, it is possible to provide a light guide member having a beneficial geometry with respect to the ability of receiving and guiding light.

In another embodiment according to the disclosure, the hearing aid further comprises i) a primary light focusing unit arranged between the first light source and the light guide member and/or between the second light source and the light guide member, the primary light focusing unit being configured to direct the first colored light and/or second colored light towards the light guide member; and/or ii) a secondary light focusing unit iia) arranged between a substantially transparent housing wall least within a proximal cross sectional area at a proximal end of the light guide member and a substantially transparent ear hook walls at least within a first cross sectional area at a first end of the light guide member to direct the first colored light and/or the second colored light towards the the ear hook, or iib) comprised at one of a substantially transparent housing wall at least within a proximal cross sectional area at a proximal end of the light guide member and a substantially transparent ear hook walls at least within a first cross sectional area at a first end of the light guide member to direct the first colored light and/or the second colored light towards the ear hook.

Hereby, it is possible to focus the light towards the light guide member. The light focusing units may be lenses that are capable of focusing light such as Fresnel lenses.

It is also possible to have one of the interfacing surface itself may be designed as a focusing unit instead of a separate unit (e.g. a lens) sandwiched between the two (housing wall-hook wall) interfacing surfaces.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. The individual features of each aspect may each be combined with any or all features of the other aspects.

These and other aspects, features and/or technical effect will be apparent from and elucidated with reference to the illustrations described hereinafter in which:

FIG. 3A illustrates a schematic, perspective, close-up view of a hearing aid according to an embodiment of the disclosure;

FIG. 3B illustrates a schematic, cross-sectional, close-up view of a hearing aid according to an embodiment of the disclosure;

FIG. 3C illustrates a close-up view of a central portion of the hearing aid shown in FIG. 3B;

FIG. 4A illustrates a schematic, cross-sectional, close-up view of a portion of hearing aid according to an embodiment of the disclosure;

FIG. 4B illustrates a schematic, cross-sectional, close-up view of a portion of hearing aid according to another embodiment of the disclosure;

FIG. 4C illustrates a schematic, cross-sectional, close-up view of a portion of hearing aid according to an even further embodiment of the disclosure;

FIG. 4D illustrates a schematic, perspective view of a first light guide member of a hearing aid according to an embodiment of the disclosure;

FIG. 4E illustrates a schematic, perspective view of a second light guide member of a hearing aid according to an embodiment of the disclosure;

FIG. 4F illustrates a schematic, perspective view of a third light guide member of a hearing aid according to an embodiment of the disclosure; and FIG. 4G illustrates a schematic, perspective view of a fourth light guide member of a hearing aid according to an embodiment of the disclosure.

DETAILED DESCRIPTION

Figure 1A:
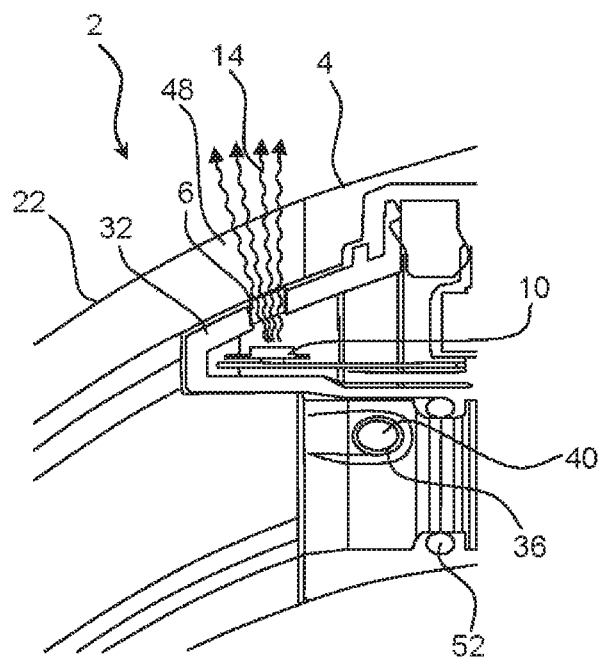
FIG. 1A illustrates a schematic view of a part of hearing aid according to an embodiment of the disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, etc.

In the description below, same reference numeral generally illustrates the same component of the hearing aid device.

In general, a hearing aid is adapted to improve or augment the hearing capability of a user by receiving an acoustic signal from a user's surroundings, generating a corresponding audio signal, modifying the audio signal and providing the modified audio signal as an audible signal to at least one of the user's ears. The "hearing aid" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

At least a part or entire hearing aid is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid. Such hearing aids include a housing comprising electronic components like a processing unit and a permanently attached or detachable ear hook that is adapted to position the hearing aid behind the user's ear or ii) Similar Behind-the-Ear type hearing aid type hearing aid arrangement comprising the housing and ear hook may be used in other stimulation types hearing aids for example as a speech processor unit in a cochlear implant or in bone conduction hearing aid.

The disclosed hearing aid may be part of i) a "hearing system", which refers to a system comprising one or two hearing aids, or ii) a "binaural hearing system", which refers to a system comprising two hearing devices where the devices are adapted to cooperatively provide audible signals to both of the user's ears. In case of the binaural hearing system, the notification may also represent operating state of the system, for example if the connection between the two hearing aids is established or lost. The hearing system or binaural hearing system may further include auxiliary device(s) that communicates with at least one hearing aids, the auxiliary device may affect the operation of the hearing aids and/or benefiting from the functioning of the hearing devices. A wired or wireless communication link between the at least one hearing aid and the auxiliary device may be established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing aid.

In general, the hearing aid includes i) an input unit such as a microphone for receiving an acoustic signal from a user's surroundings and providing a corresponding input audio signal, and/or ii) a receiving unit for electronically receiving an input audio signal. The hearing aid further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant. The Cochlear Implant typically includes i) an external part (speech processor in the housing with a permanently attached or detachable ear hook) for picking up and processing sound from the environment, and for determining sequences of pulses for stimulation of the electrodes in dependence on the current input sound, ii) a (typically wireless, e.g. inductive) communication link for simultaneously transmitting information about the stimulation sequences and for transferring energy to iii) an implanted part allowing the stimulation to be generated and applied to a number of electrodes, which are implantable in different locations of the cochlea allowing a stimulation of different frequencies of the audible range. Such systems are e.g. described in U.S. Pat. No. 4,207,441 and in U.S. Pat. No. 4,532,930.

FIG. 1A illustrates a schematic view of a part of hearing aid 2 according to an embodiment of the disclosure. The hearing aid 2 comprises a housing 4 and an ear hook 22 mechanically attached thereto. The ear hook 22 generally comprises a tubular structure 56 (see FIG. 2) received by a corresponding cavity 60 (see FIG. 2) provided in the housing 4. The ear hook 22 comprises a transparent ear hook walls 48. An O-ring 52 is attached to a narrow portion of the tubular structure 56 positioned close to the distal end of the tubular structure 56. A through-going hole 36 is provided in the tubular structure 56 of the ear hook 22. The through-going hole 36 is configured to receive a corresponding attachment unit 40 which is formed as a pin. A corresponding hole (see 38 in FIG. 1B) is provided in the housing 4 for allowing passage of the attachment unit 40.

In an embodiment, the housing 4 is provided with a protruding part 32 extending into a receiving section of the ear hook 22. Accordingly, the protruding part 32 is received by the receiving section of the ear hook 22.

Several electronic components are arranged in the housing 4. In an embodiment, a first light source 10 is arranged in the protruding part 32 of the housing 4. The first light source 10 is a LED configured to emit a first colored light 14. A light guide member (6, FIG. 1A) is arranged within the protruding part 32 of the housing 4 or as an integral protrusion (6, FIG. 1B) from the housing 4. The light guide member may be either hollow or solid.

Even though not shown, in an embodiment, a second light source is arranged next to the first light source 10 in the protruding part 32 of the housing 4. The second light source is provided as a LED configured to emit another colored light (not shown).

The light guide member 6 is arranged and shaped to allow the first colored light 14 and the second colored light to travel through the light guide member 6 and further through the ear hook 22, which is transparent or at least semi-transparent. The light guide member 6 is formed to allow a substantial amount of the first colored light 14 and a substantial amount of the second colored light to be mixed within the light guide member 6 to generate a mixed light of a third color. The light guide member 6 is configured to focus the light 14 emitted by the first light source 10 and by the second light source. The housing comprises a processing unit (not shown) configured to operate the first light source 10 and the second light source in one or more modes. In a preferred embodiment, according to the disclosure the processing unit is configured to be operated in a singular mode where only one of the first light source 10 and the second light source is activated to emit the first colored light 14 for providing a first notification and to emit the second colored light for providing a second notification, respectively. The processing unit may be configured to be operated in a mixed mode, wherein both the first light source 10 and the second light source are activated for generating a mixed light of the third color comprising the first colored light 14 and the second colored light for providing a third notification.

Figure 1B:
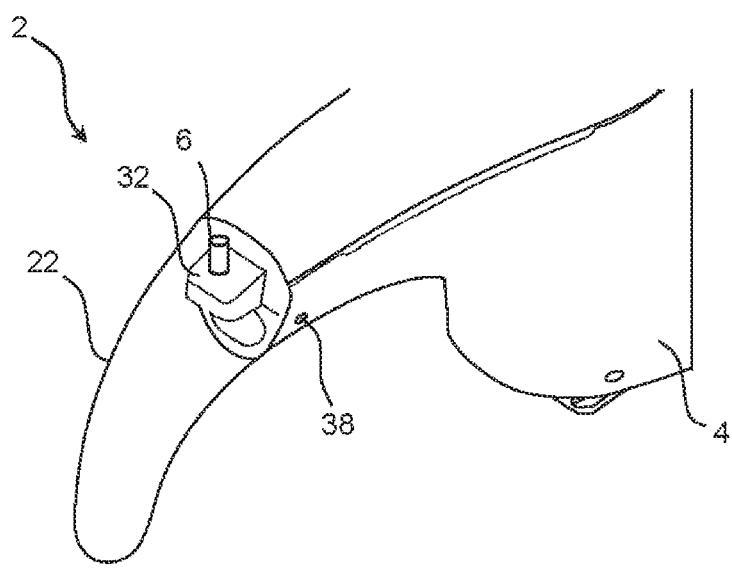
FIG. 1B illustrates a schematic, perspective view of hearing aid according to an embodiment of the disclosure.

FIG. 1B illustrates a schematic, perspective view of hearing aid 2 according to an embodiment of the disclosure corresponding to the one shown in FIG. 1A. The hearing aid 2 comprises a housing 4 and an ear hook 22 attached thereto. The housing 4 comprises a protruding part 32 which has been received by a receiving section of the ear hook 22. A through-going hole 38 for receiving an attachment unit such as a pin (see 40 in FIG. 1A) is provided in the housing 4.

Figure 2A:
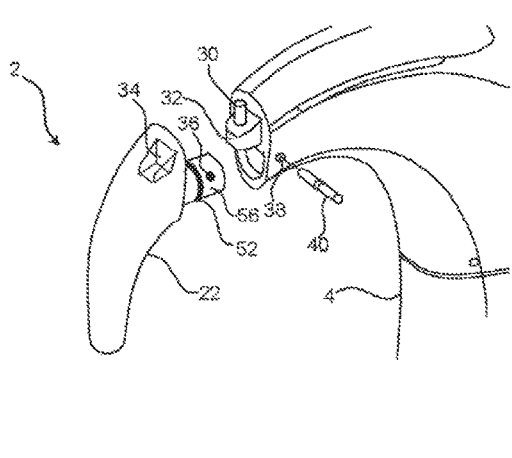
FIG. 2A illustrates a schematic, perspective view of hearing aid according to an embodiment of the disclosure, in which an ear hook is separated from a housing.

FIG. 2A illustrates a schematic, perspective view of hearing aid 2 according to an embodiment of the disclosure. The hearing aid 2 comprises a housing 4 and a transparent ear hook 22 that is configured to be detachably attached to the housing 4.

The ear hook 22 comprises a tubular structure 56 protruding from the remaining part of the ear hook 22. The tubular structure 56 is provided with a through-going hole 36 and an O-ring 52 for sealing against the tubular structure 56 when the tubular structure 56 is inserted into a corresponding cavity in the distal portion of the housing 4.

The ear hook 22 is provided with a receiving section 34 shaped and configured to receive a corresponding protruding part 32 of the housing 4. The protruding part 32 is equipped with a tunnel-shaped, hollow or solid, light guide member 6. The light guide member 6 is configured to guide and mix a first colored light and a second colored light within the light guide member 6 to generate a mixed light of a third color.

A through-going hole 38 is provided in the housing 4. The through-going hole 38 is configured to receive an attachment unit 40 such as a pin. The ear hook 22 is configured to be attached to the housing 4 by means of the pin-shaped attachment unit 40 extending through the through-going hole 38 is provided in the housing 4 and further through the through-going hole 36.

Figure 2B:
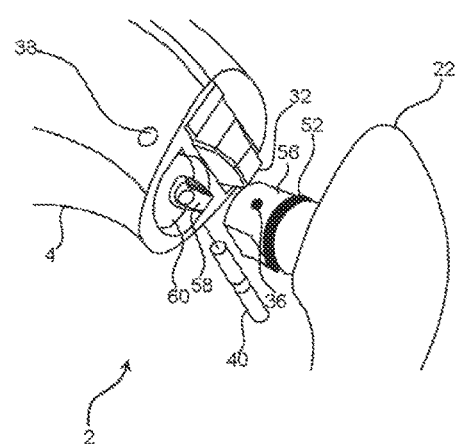
FIG. 2B illustrates a schematic, perspective, close-up view of the hearing aid shown in FIG. 2A.

FIG. 2B illustrates a schematic, perspective, close-up view of the hearing aid 2 shown in FIG. 2A. The housing 4 is provided with a cavity 60 shaped and configured to receive the tubular structure 56 of the transparent ear hook 22. A recess 58 is provided in the cavity 60. A through-going hole 32 is provided in the recess 58. The recess 58 of the cavity 60 is configured to prevent the O-ring 52 from being cut by the housing 4 when the attachment unit 40 formed as a pin is inserted into the holes 32, 36.

FIG. 3A illustrates a schematic, perspective, close-up view of a hearing aid 2 corresponding to the one shown in FIG. 2B. Accordingly, the same features as explained with reference to FIG. 2B are present in FIG. 3A. A tunnel-shaped light guide member 6, hollow or solid, is provided in the protruding part 32 of the housing 4. This implementation allows for the protruding part providing the functionalities of mixing light using the light guide member, immovable attaching and aligning of through holes of the housing and ear hook, and placing of light in internal space of the protruded part thereby optimizing limited space usage of the housing. Mixed light 18 is guided by the light guide member 6. The mixed light 18 is indicated by arrows. When the ear hook 22 is attached to the housing 4, the mixed light 18 will be transmitted through the transparent ear hook 22. Accordingly, the mixed light 18 is visible for the user of the hearing aid 2. It has to be underlined that a single first colored light or second colored light may also be individually transmitted through the light guide member 6 instead of a mixed light 18.

The protruding part 32 of the housing 4 comprises an inclined upper surface can be used to guide the ear hook 22 into the intended position within the receiving section 34. The inclined upper surface prevents the ear hook 22 from being rotated relative to the housing 3 when the ear hook 22 has been attached to the housing 4.

FIG. 3B illustrates a schematic, cross-sectional, close-up view of a hearing aid according to an embodiment of the disclosure and FIG. 3C illustrates a close-up view of a central portion of the hearing aid shown in FIG. 3B. It can be seen that the housing 4 comprises a through-going hole through which an attachment unit 40 shaped as a pin extend. Hereby, the pin is used to mechanically attach the housing 4 and the tubular structure 56 of an ear hook (not shown) of the hearing aid to each other. The tubular structure 56 comprises a centrally arranged hole 66.

In FIG. 3C it can be seen that the attachment unit 40 is shaped as a pin provided with a centrally arranged indentation 64. A corresponding engagement structure 62 is provided in the tubular structure 56. The engagement structure 62 is brought into engagement with the indentation 64. The diameter $D_1$ of the portion of the attachment unit 40 comprising the indentation 64 is smaller than the diameter $D_2$ of the remaining portion of the attachment unit 40. Hereby, the corresponding engagement structure 62 and indentation 64 secure that the attachment unit 40 is attached centrally in the through-going hole in the tubular structure 56 during insertion.

FIG. 4A illustrates a schematic, cross-sectional, close-up view of a portion of hearing aid 2 according to an embodiment of the disclosure. A first light source 10 and a second light source 12 are electrically connected to a processing unit 20 being part of the electronic components arranged in the housing of the hearing aid. A first light source 10 is a LED configured to emit light 14 of a first color, whereas the second light source 12 is a LED configured to emit light 14 of a second color. The housing of the hearing aid is provided with a light guide member 6 being a tunnel 26 extending through the wall of the housing. The first light 14 and the second light 16 are mixed in the light guide member 6 to form a mixed light 18 leaving the light guide member 6.

In an embodiment, a hollow tunnel 26 is provided with an inner surface 28 comprising a reflective lining. Hereby, the light 14, 16 will be reflected by the inner surface 28 and the fraction of light that may transmit out of the walls of the tunnel can be reduced or even eliminated. The reflective lining may be made of any suitable material. The reflective lining may be a layer of reflective material attached to or integrated into the surface of the tunnel 26.

The tunnel 26 may have any suitable cross section. The cross section of the tunnel 26 may be circular, elliptical, rectangular or square. The light guide member 6 may be uniform along length of the light guide member 6. It is, however, also possible to provide a light guide member 6 that varies along length of the light guide member 6.

FIG. 4B illustrates a schematic, cross-sectional, close-up view of a portion of hearing aid according to another embodiment of the disclosure. The hearing aid is almost identical to the one shown in FIG. 4A. The only difference is that a primarily light focusing unit 42 and a secondary light focusing unit 44 are provided in the tunnel 26. Accordingly, the light guide member 6 is capable of focusing the mixed light 18 leaving the light guide member 6. The light focusing units 42, 44 are optical lenses. It is possible to apply different lens setups according to the specific requirements or the geometric shape of the tunnel 26.

FIG. 4C illustrates a schematic, cross-sectional, close-up view of a portion of hearing aid according to an even further embodiment of the disclosure. The hearing aid comprises a housing 4 provided with a light guide member 6 shaped as a tunnel extending through the housing wall 24. The light guide member 6 has a uniform cross section and a diameter $D_3$. The length L along the longitudinal axis X of the light guide member 6 is indicated in FIG. 4C.

A first light focusing unit 42 and a second light focusing unit 44 are arranged in the light guide member 6. The light focusing units 42, 44 are optical lenses. It is possible to apply different lens setups according to the specific requirements or the geometric shape of the light guide member 6. It can be seen that the first light 14 emitted by the first light source 10 and the second light 16 emitted by the second light source 12 are mixed in the light guide member 6 to form mixed light 18. The mixed light 18 is focused in a focus zone Z established by means of a second light focusing unit 44 (an optical lens). Dotted lines indicate the focus zone Z. A first light focusing unit 42 (a lens) is provided next to the second light focusing unit 44. The first light focusing unit 42 is further focusing the mixed light 18.

FIG. 4D illustrates a schematic, perspective view of a light guide member 6 of a hearing aid according to an embodiment of the disclosure. The light guide member 6 has a length L and a uniform triangular cross-sectional area. Accordingly, the cross-sectional area $A_1$ of the front end equals the cross-sectional area $A_2$ of the rear end of the light guide member 6. It is, however, possible to modify the light guide member 6 so the cross-sectional area varies along the length of the light guide member 6.

FIG. 4E illustrates a schematic, perspective view of a light guide member 6 of a hearing aid according to another embodiment of the disclosure. The light guide member 6 has a length L and a rectangular cross-sectional area. FIG. 4E indicates the cross-sectional area $A_1$ of the front end and the cross-sectional area $A_2$ of the rear end of the light guide member 6. In one embodiment according to the disclosure the light guide member 6 as a uniform cross-sectional area. In another embodiment according to the disclosure the cross-sectional area vary along the length of the light guide member 6.

FIG. 4F illustrates a schematic, perspective view of a light guide member 6 of a hearing aid according to a further embodiment of the disclosure. The light guide member 6 has a length L and an oval (elliptic) cross-sectional area. Both the cross-sectional area $A_1$ of the first end $E_1$ (front end) and the cross-sectional area $A_2$ of the second end $E_2$ (the rear end) of the light guide member 6 are indicated in FIG. 4F. The light guide member 6 may have a uniform cross-sectional area. However, it is also possible to provide the light guide member 6 with a geometry having a cross-sectional area that varies along the length of the light guide member 6. The inner surface 28 of the light guide member 6 is a hollow light guide tube 68 and is provided with a reflective lining or reflective layer. Hereby, the light guide member 6 is capable of reflecting light oriented towards the inner surface 28 instead of absorbing the light.

FIG. 4G illustrates a schematic, perspective view of a light guide member 6 of a hearing aid according to an even further embodiment of the disclosure. The light guide member 6 has a length L and a circular cross-sectional area. Both the cross-sectional area $A_{1*}$ of the front end and the cross-sectional area $A_{2*}$ of the rear end of the light guide member 6 are indicated. The light guide member 6 may have a uniform cross-sectional area or a cross-sectional area that varies along the length of the light guide member 6. The circumference C of the front end of the light guide member 6 is indicated in FIG. 4G. The illustrated light guide member is a solid light guide member 30, which has a smooth outer surface 70. The outer surface may be painted with suitable material in order to provide smoothness and/or a layer that is adapted to avoid the light being transmitted out of the light guide member.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore. "connected" or "coupled" as used herein may include wirelessly connected or coupled. As used herein, the term "and/or" includes any and all combinations of one or more of the associated listed items.

The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

LIST OF REFERENCE NUMERALS

2 Hearing aid
4 Housing
6 Light guide member
8 Electronic component
10 First light source
12 Second light source
14 First coloured light
16 Second coloured light
18 Mixed light
20 Processing unit
22 Ear hook
24 Housing wall
26 Tunnel
28 Inner surface
30 Solid light guide member
32 Protruding part
34 Receiving section
36, 38 Through-going hole
40 Attachment unit
42 Primary light focusing unit
44 Second light focusing unit
48 Ear hook wall
50 Cross section
52 O-ring
56 Tubular structure
58 Recess
60 Cavity
62 Engagement structure
64 Indentation
66 Hole
68 Hollow light guide tube
70 Outer surface
X Longitudinal axis
L Length
$D_1, D_2, D_3$ Diameter
C Circumference
$A_1$ First cross-sectional area
$A_2$ Second cross-sectional area
$E_1$ First end
$E_2$ Second end
Z Zone

The invention claimed is:

1. A hearing aid comprising
a housing comprising electronic components configured to generate a perceivable modulated signal in response to a received sound, the perceivable modulated signal being configured to produce a hearing sensation to a user of the hearing aid;
   a light guide member arranged proximal to and/or within the housing;
a first light source configured to emit a first colored light and a second light source configured to emit a second colored light, the first light source and the second light source being positioned within the housing and arranged in relation to the light guide member such that a substantial amount of the first colored light and a substantial amount of the second colored light are adapted to travel through the light guide member; and
the light guide member comprises dimensions such that the substantial amount of the first colored light and the substantial amount of second colored light are mixed within the light guide member to generate a light of a third color.

2. The hearing aid according to claim 1, wherein the dimensions are defined by
   a ratio between circumference and length of the light guide member, the ratio being below a threshold ratio; and/or
   a cross-sectional threshold ratio between cross sectional surface area of the light guide member at the light source end and length of the light guide member.

3. The hearing aid according to claim 2, wherein the threshold ratio is less than 9 and/or the cross-sectional threshold ratio is less than 4.5.

4. The hearing aid according to claim 1, wherein the electronic component comprises a processing unit configured to operate the first light source and the second light source in
   a singular mode where only one of the first light source and the second light source is activated to emit the first colored light for providing a first notification and to emit the second colored light for providing a second notification respectively; and
   a mixed mode where both the first light source and the second light source are activated for producing a mixed light of the third color comprising the first colored light and the second colored light for providing a third notification, wherein
      the processing unit is configured to operate the first light source and the second light source in the singular mode or mixed mode in response to operating status of the hearing aid.

5. The hearing aid according to claim 1, wherein
   the electronic component comprises the processing unit configured to control relative intensities of the first colored light and the second colored light such that different shades of the third color are produced in the mixed mode, the different shades being assignable to different operating status notifications.

6. The hearing aid according to claim 1, wherein the light guide member is at least partly contained in a permanently attached or detachably attached ear hook such that the light guide member is
   i) completely contained in the ear hook defining proximity to the housing; or
   ii) partly contained in the ear hook defining proximity to the housing and partly contained in the housing.

7. The hearing aid according to claim 1, wherein the light guide member is completely contained within the housing as an integrated protrusion from the housing or a guide section running along thickness of the wall of the housing.

8. The hearing aid according to claim 6, wherein the housing comprises a substantially transparent housing wall at least within a proximal cross sectional area at a proximal end of the light guide member, the substantially transparent housing wall being configured to allow at least one of the first colored light, and second colored light to emit out of the housing towards the ear hook; and
   the ear hook comprises substantially transparent ear hook walls at least within a first cross sectional area and a second cross sectional area at a first end and a second end of the light guide member respectively, the substantially transparent ear hook wall at the first end is configured to receive at least one of the first colored light and second colored light from the proximal area and substantially transparent hook wall at the second end allows at least one of the first colored light, second colored light and third colored light to emit out of the hearing aid.

9. The hearing aid according to claim 1, wherein the light guide member comprises
a solid or hollow tunnel comprising a cross section selected from a group consisting of a circular cross section, elliptical cross section, rectangular cross section and square cross section, wherein
the cross section of the light guide member is dimensioned such that the light guide member is uniform along length of the light guide member or the cross section of the light guide member varies along length of the light guide member, the variation comprising gradual or stepwise reduction in dimension from the end of the light source to end of the ear hook.

10. The hearing aid according to claim 1, wherein the light guide member is a hollow light guide tube comprising an inner surface having a reflective lining configured to reflect the light impinging of the inner surface towards center of the light guide tube.

11. The hearing aid according to claim 1, wherein the first light source and the second light source are arranged symmetrically or asymmetrically with respect to the cross section of the light guide member at the light source end.

12. The hearing aid according to claim 1, wherein the first light source and the second light source are arranged asymmetrically with respect to the cross section of the light guide member at the light source end, the asymmetric arrangement being a function of scattering of the first light from the first light source and scattering of the second light from the second light source along the length of the light guide member.

13. The hearing aid according to claim 1, wherein one of the housing or ear hook comprises a protruded part and another of the housing or ear hook comprises a receiving section, the protruded part and the receiving section being configured to couple such that
i) the light guide member is contained completely in the ear hook and aligns with the first light source and the second light source; or
ii) the light guide member is contained completely in the housing as an integrated protrusion at the protruded part of the housing and is adapted to be received within the receiving section of a substantially transparent ear hook; or
ii) the light guide member is contained partly in the ear hook and aligns with the light guide member that is partly contained in the housing.

14. The hearing aid according to claim 12, wherein the coupling of the protruded part and the receiving section is configured to align a through-going hole of the ear hook and a through-going hole of the housing such that the aligned through-going holes are configured to receive an attachment unit to immovably attach the detachably attached ear hook to the housing.

15. The hearing aid according to claim 1, further comprising
i) a primary light focusing unit arranged between the first light source and the light guide member and/or between the second light source and the light guide member, the primary light focusing unit being configured to direct the first colored light and/or second colored light towards the light guide member; and/or
ii) a secondary light focusing unit
iia) arranged between a substantially transparent housing wall at least within a proximal cross sectional area at a proximal end of the light guide member and a substantially transparent ear hook walls at least within a first cross sectional area at a first end of the light guide member to direct the first colored light and/or the second colored light towards the ear hook, or
iib) comprised at one of a substantially transparent housing wall at least within a proximal cross sectional area at a proximal end of the light guide member and a substantially transparent ear hook walls at least within a first cross sectional area at a first end of the light guide member to direct the first colored light and/or the second colored light towards the ear hook.

16. The hearing aid according to claim 2, wherein the electronic component comprises a processing unit configured to operate the first light source and the second light source in
a singular mode where only one of the first light source and the second light source is activated to emit the first colored light for providing a first notification and to emit the second colored light for providing a second notification respectively; and
a mixed mode where both the first light source and the second light source are activated for producing a mixed light of the third color comprising the first colored light and the second colored light for providing a third notification, wherein
the processing unit is configured to operate the first light source and the second light source in the singular mode or mixed mode in response to operating status of the hearing aid.

17. The hearing aid according to claim 3, wherein the electronic component comprises a processing unit configured to operate the first light source and the second light source in
a singular mode where only one of the first light source and the second light source is activated to emit the first colored light for providing a first notification and to emit the second colored light for providing a second notification respectively; and
a mixed mode where both the first light source and the second light source are activated for producing a mixed light of the third color comprising the first colored light and the second colored light for providing a third notification, wherein
the processing unit is configured to operate the first light source and the second light source in the singular mode or mixed mode in response to operating status of the hearing aid.

18. The hearing aid according to claim 2, wherein
the electronic component comprises the processing unit configured to control relative intensities of the first colored light and the second colored light such that different shades of the third color are produced in the mixed mode, the different shades being assignable to different operating status notifications.

19. The hearing aid according to claim 3, wherein
the electronic component comprises the processing unit configured to control relative intensities of the first colored light and the second colored light such that different shades of the third color are produced in the mixed mode, the different shades being assignable to different operating status notifications.

20. The hearing aid according to claim 4, wherein
the electronic component comprises the processing unit configured to control relative intensities of the first colored light and the second colored light such that different shades of the third color are produced in the mixed mode, the different shades being assignable to different operating status notifications.

* * * * *